(12) United States Patent  
Inokuchi

(10) Patent No.: US 11,796,655 B2  
(45) Date of Patent: Oct. 24, 2023

(54) SIGNAL PROCESSING DEVICE AND SIGNAL PROCESSING METHOD

(71) Applicant: JAPAN AEROSPACE EXPLORATION AGENCY, Tokyo (JP)

(72) Inventor: Hamaki Inokuchi, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 345 days.

(21) Appl. No.: 16/769,447

(22) PCT Filed: Nov. 13, 2018

(86) PCT No.: PCT/JP2018/041995  
§ 371 (c)(1),  
(2) Date: Jun. 3, 2020

(87) PCT Pub. No.: WO2019/111654  
PCT Pub. Date: Jun. 13, 2019

(65) Prior Publication Data  
US 2020/0371218 A1  Nov. 26, 2020

(30) Foreign Application Priority Data

Dec. 6, 2017 (JP) ................................. 2017-234165

(51) Int. Cl.  
*G01S 7/497* (2006.01)  
*G01S 17/50* (2006.01)  
(Continued)

(52) U.S. Cl.  
CPC .............. *G01S 7/497* (2013.01); *G01S 17/50* (2013.01); *G01S 17/95* (2013.01); *G01S 13/953* (2013.01); *G01S 15/885* (2013.01)

(58) Field of Classification Search  
CPC ........ G01S 7/285; G01S 7/292; G01S 7/2922; G01S 7/2923; G01S 7/2926;  
(Continued)

(56) References Cited

U.S. PATENT DOCUMENTS

2006/0187111 A1* 8/2006 Uchino ................. G01S 7/285  
342/84  
2007/0202887 A1 8/2007 Counts et al.  
(Continued)

FOREIGN PATENT DOCUMENTS

EP  0730166 A1 * 9/1996  
JP  1-152382 A  6/1989  
(Continued)

OTHER PUBLICATIONS

Wikipedia, "Pulse-Doppler signal processing", May 26, 2017 (Year: 2017).*

(Continued)

*Primary Examiner* — Luke D Ratcliffe  
(74) *Attorney, Agent, or Firm* — Saliwanchik, Lloyd & Eisenschenk

(57) ABSTRACT

[Object] To appropriately evaluate reliability of a reception signal.  
[Solving Means] A signal processing unit 20 includes a first integration unit 21, a Doppler detection unit 22, and a comparator circuit 28 as a reliability index calculation unit. The first integration unit 21 intermittently integrates a pulse train corresponding to a reception signal by using two systems and obtains two pieces of integrated data. The Doppler detection unit 22 divides each of the two pieces of integrated data into a plurality of range bins in time series, obtains a relationship between a frequency and intensity in each range bin for each of the two pieces of integrated data, and detects a Doppler shift amount from the relationship.

(Continued)

The comparator circuit 28 calculates a reliability index of the reception signal by comparing the Doppler shift amounts (wind velocity values) of the two pieces of integrated data.

4 Claims, 12 Drawing Sheets

(51) Int. Cl.
*G01S 17/95* (2006.01)
*G01S 13/95* (2006.01)
*G01S 15/88* (2006.01)

(58) Field of Classification Search
CPC .... G01S 7/2927; G01S 7/4021; G01S 7/4861; G01S 7/4873; G01S 7/4913; G01S 7/493; G01S 7/497; G01S 13/50; G01S 13/885; G01S 13/95; G01S 13/953; G01S 15/50; G01S 15/885; G01S 17/50; G01S 17/885; G01S 17/95

See application file for complete search history.

(56) References Cited

U.S. PATENT DOCUMENTS

| | | |
|---|---|---|
| 2011/0134412 A1 | 6/2011 | Inokuchi |
| 2013/0088705 A1 | 4/2013 | Asahara et al. |
| 2016/0003946 A1* | 1/2016 | Gilliland ............... G01S 17/894 356/5.01 |
| 2017/0343652 A1* | 11/2017 | de Mersseman ..... G01S 7/4861 |
| 2018/0017676 A1 | 1/2018 | Asada et al. |

FOREIGN PATENT DOCUMENTS

| | | | |
|---|---|---|---|
| JP | 9-113613 | A | 5/1997 |
| JP | 9-211115 | A | 8/1997 |
| JP | 11-128226 | A | 5/1999 |
| JP | 2002-311130 | A | 10/2002 |
| JP | 2005-50187 | A | 2/2005 |
| JP | 2006-284260 | A | 10/2006 |
| JP | 5252696 | B2 | 7/2013 |
| JP | 5398001 | B2 | 11/2013 |
| JP | 5771893 | B2 | 9/2015 |
| JP | 5881099 | B2 | 3/2016 |
| JP | 2017-67680 | A | 4/2017 |
| KR | 101807522 | B1 * | 12/2017 |
| WO | 2005/076035 | A1 | 8/2005 |
| WO | WO-2016/125399 | A1 | 8/2016 |

OTHER PUBLICATIONS

Supplementary European Search Report dated Jul. 30, 2021 in European Application No. 18885414.5.

Inokuchi, H. et al., "Development of an Onboard Doppler Lidar for Flight Safety." *Journal of Aircraft*, Jul.-Aug. 2009, 46(4):1411-1415.

Office Action dated Dec. 15, 2021 in Japanese Application No. 2017-234165.

* cited by examiner

SIGNAL PROCESSING DEVICE AND SIGNAL PROCESSING METHOD

CROSS-REFERENCE TO RELATED APPLICATIONS

This application is the U.S. national stage application of International Patent Application No, PCT/JP2018/041995, filed Nov. 13, 2018, which claims the benefit under 35 U.S.C. § 119 of Japanese Application No. 2017-234165, filed Dec. 6, 2017, the disclosures of each of which are incorporated herein by reference in their entirety.

TECHNICAL FIELD

The present invention relates to a signal processing device and a signal processing method that are used in, for example, a remote airflow measurement apparatus that detects turbulence into which an aircraft runs.

BACKGROUND ART

Turbulence has recently attracted attention as a main cause of aircraft accidents, and the technology regarding a Doppler lidar using laser light has been researched and developed for an airborne device that detects turbulence in advance (see, for example, Non-Patent Literature 1).

To use the Doppler lidar to inhibit turbulence-induced accidents of the aircraft, the following methods are employed, such as a method of reporting turbulence occurring forward in a flight direction to a pilot such that the pilot copes with the turbulence by a flight to avoid the turbulence, switch-on of the seat belt sign, and the like, and a method of transmitting airflow information to an on-board computer and automatically controlling a control surface to thereby alleviate a gust of the aircraft when the aircraft runs into the turbulence (see, for example, Patent Literature 2).

To control the above-mentioned control surface, a vertical airflow vector needs to be obtained. The inventors of the present invention propose, in Patent Literature 1, the technology of geometrically converting observation values of two sets of Doppler lidars to obtain a vertical airflow vector.

Patent Literature 3 proposes a method of improving the performance of a Doppler lidar, Patent Literature 4 proposes a technique of reducing unnecessary noise, and Patent Literature 5 proposes a technique of accurately obtaining an airflow vector. Patent Literature 5 discloses a technique of removing an erroneous detection, which is processing downstream of a signal. If the erroneous detection is reduced upstream of the signal, an effect of removing the erroneous detection increases.

CITATION LIST

Patent Literature

Patent Literature 1: Japanese Patent No. 5398001
Patent Literature 2: Japanese Patent No. 5771893
Patent Literature 3: Japanese Patent No. 5252696
Patent Literature 4: Japanese Patent No. 5881099
Patent Literature 5: Japanese Patent Application Laid-open No. 2017-67680
Non-Patent Literature 1: H. Inokuchi, H. Tanaka, and T. Ando, "Development of an Onboard Doppler LIDAR for Flight Safety," Journal of Aircraft, Vol. 46, No. 4, PP. 1411-1415, AIAA, July-August, 2009.

DISCLOSURE OF INVENTION

Technical Problem

For example, if the airflow information is used to automatically control the control surface as described above, inappropriate control of the control surface due to erroneous signals and observation errors is unacceptable for the operational safety of the aircraft. Nevertheless, the conventional technologies have output erroneous signals in some rare cases. In other words, the conventional technologies have failed to appropriately evaluate reliability of observation signals as reception signals. Thus, the conventional technologies have falsely recognized noise as a signal if a signal-to-noise ratio (SNR) is low, and have been forced to abandon long-distance observation information if information having a high SNR and high reliability is used alone, which leads to a drawback such as significant performance degradation of an observation distance. The erroneous signals are caused by noise constantly present and thus it is impossible to consider the erroneous signals as being zero. However, if the erroneous detection can be correctly recognized as an erroneous detection, the erroneous detection can be invalidated.

In view of the circumstances as described above, it is an object of the present invention to provide a signal processing device and a signal processing method that can appropriately evaluate reliability of a reception signal.

Solution to Problem

To achieve the above-mentioned object, a signal processing device according to an embodiment of the present invention includes: a first integration unit that intermittently integrates a signal train corresponding to a reception signal by using a plurality of systems to obtain a plurality of pieces of integrated data; and a reliability index calculation unit that calculates a reliability index of the reception signal by comparison based on the plurality of pieces of integrated data.

In the present invention, a signal train corresponding to a reception signal is intermittently integrated by using a plurality of systems, and a plurality of pieces of integrated data is obtained. By comparison based on the plurality of pieces of integrated data, a reliability index of the reception signal is calculated. This reliability index allows the reliability of the reception signal to be appropriately evaluated.

The signal train corresponding to the reception signal may be a signal train of a difference between a frequency of the reception signal and a frequency of a transmission signal, the reception signal being obtained when a reflected signal of the transmission signal is received, the transmission signal including successive pulse trains emitted into an atmosphere. The signal processing device may include a Doppler detection unit that divides each of the plurality of pieces of integrated data into a plurality of range bins in time series, obtains a relationship between a frequency and intensity in each of the range bins for each of the pieces of integrated data, and detects a Doppler shift amount from the relationship. The reliability index calculation unit may calculate a reliability index of the reception signal by comparing the Doppler shift amounts of the plurality of pieces of integrated data.

If the successive pulse trains are intermittently integrated, pulses different from each other can be integrated, but they are measured in a nearly equal space and at a nearly equal time and thus the signals are nearly equal to each other.

Thus, if an appropriate signal can be recognized due to less noise, wind velocities obtained by integrating different pulses are nearly equal to each other. In contrast to this, if an appropriate signal fails to be recognized due to a lot of noise, wind velocities obtained by integrating different pulses have different values, and thus a difference between the wind velocity values obtained from the respective pieces of integrated data is output as a reliability index of the measurement.

The signal processing device may further include a second integration unit that integrates the Doppler shift amount of each of the plurality of pieces of integrated data.

The reliability index calculation unit may calculate, as the reliability index, a difference in the Doppler shift amount between the plurality of pieces of integrated data.

A signal processing method according to an embodiment of the present invention includes: intermittently integrating a signal train corresponding to a reception signal by using a plurality of systems to obtain a plurality of pieces of integrated data; and calculating a reliability index of the reception signal by comparison based on the plurality of pieces of integrated data. This allows the reliability of the reception signal to be appropriately evaluated.

A remote airflow measurement apparatus according to an embodiment of the present invention includes: a reception unit that emits a pulse-form signal into an atmosphere, receives a reflected signal from the atmosphere, and intermittently integrates pulses of the reflected signal; a measurement unit that integrates pulses different from each other to obtain two or more pieces of integrated data and then measures a wind velocity in an emission-axis direction on the basis of a Doppler shift amount in frequency between the emitted signal and the reflected signal; and a processing unit that outputs a difference between wind velocity values obtained from the respective pieces of integrated data as a reliability index of the measurement.

This allows the index, with which the reliability can be quantitatively determined, to be added to a measured value and allows the resultant value to be used as a coefficient for determining whether the measured value is usable or as a weighting coefficient on the basis of the reliability index.

Note that an erroneous detection resulting from white noise occurs at random frequencies. Non-random noise is colored noise and can thus be removed using the technology disclosed in Patent Literature 4, for example.

The remote airflow measurement apparatus according to an embodiment of the present invention is typically applied to an airborne optical remote airflow measurement apparatus of a Doppler lidar system. For example, the remote airflow measurement apparatus emits laser light, receives reflected light from atmospheric aerosol particles (dust and fine particle), and measures a moving velocity of the particles as a wind velocity.

The present invention is applicable to not only an airborne apparatus but also a ground apparatus. Additionally, the present invention is applicable to not only a Doppler lidar but also a Doppler radar.

Here, taking a Doppler lidar for example, the remote airflow measurement apparatus according to an embodiment of the present invention emits pulse-form laser light into the atmosphere and receives Mie scattering resulting from atmospheric aerosol particles or Rayleigh scattering resulting from air molecules. Reception pulse trains are generated as pulse trains having a plurality of patterns obtained by intermittently integrating a transmission pulse train, and peak values of respective frequencies are obtained. From the difference in peak value between the frequency of the transmission light and the frequency of the reception light, a wind velocity can be obtained on the basis of the Doppler effect.

The peak values are alternative wind velocity values. If the peak values are equal to each other, they are considered as correct measured values, and if different from each other, it is likely that an erroneous detection of peak values due to noise is included. Therefore, if an absolute value of the difference between the measured values is used as a reliability index, data with high reliability can be selectively used.

According to the present invention, use of reliability information in the airflow measurement allows the weighting of a signal corresponding to reliability and the invalidation of a signal with no reliability, which reduces a possibility of using incorrect data.

Advantageous Effects of Invention

According to the present invention, the reliability of the reception signal can be appropriately evaluated.

MODE(S) FOR CARRYING OUT THE INVENTION

Hereinafter, embodiments of the present invention will be described with reference to the drawings.

[Remote Airflow Measurement Apparatus]

Description will be given on an embodiment in which a signal processing device according to the present invention is applied to an airborne optical remote airflow measurement apparatus of a Doppler lidar system.

Figure 1:
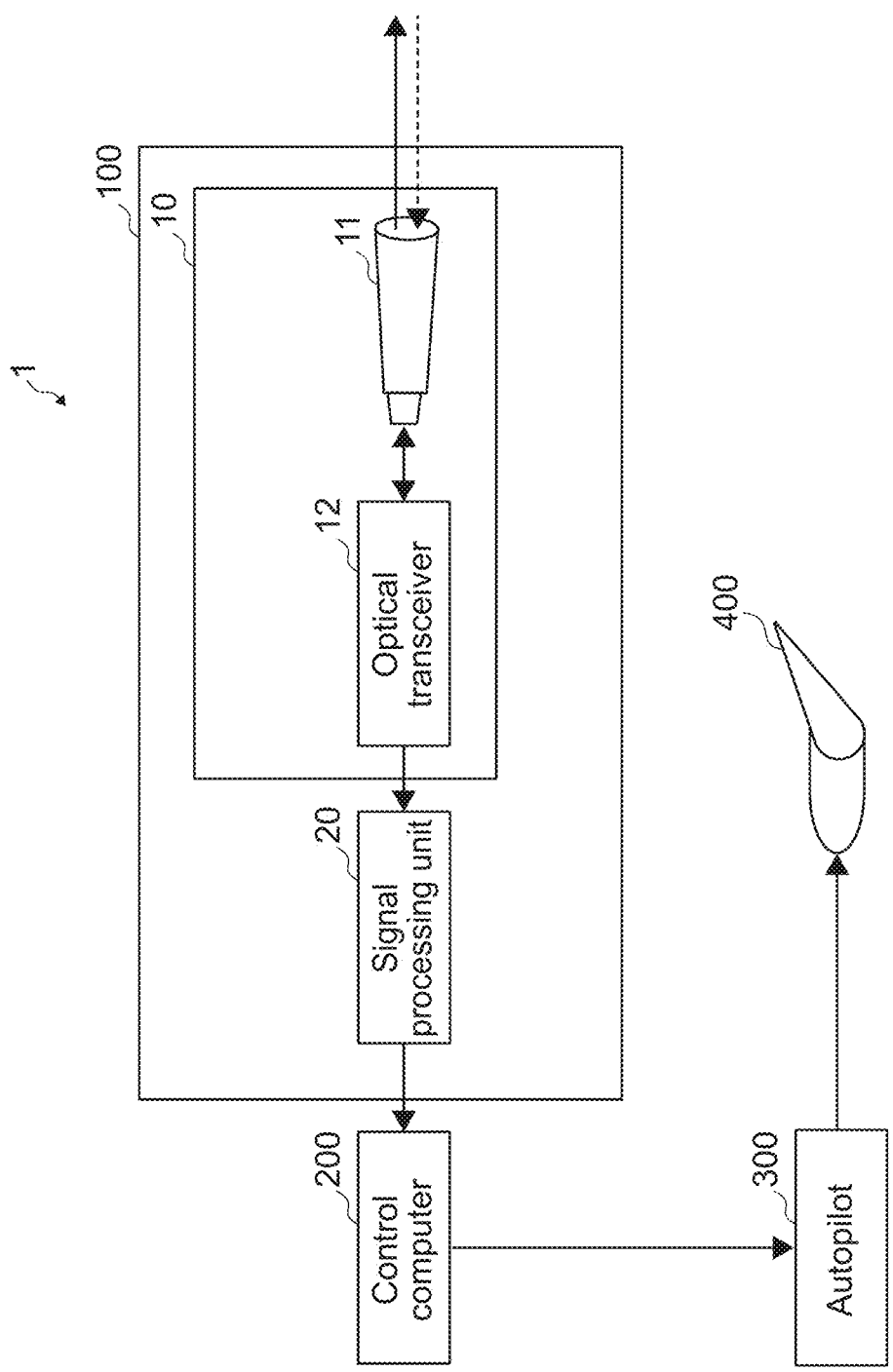
FIG. 1 is a block diagram of a configuration of a remote airflow measurement apparatus according to an embodiment of the present invention.

FIG. 1 is a block diagram of a configuration of a remote airflow measurement apparatus according to an embodiment of the present invention.

As shown in FIG. 1, a remote airflow measurement apparatus 100 includes a measurement unit 10 and a signal processing unit 20.

If the remote airflow measurement apparatus is used to control gust alleviation for an aircraft, it is generally necessary to calculate an airflow vector in the vertical direction, and thus laser light is emitted in a plurality of directions. However, a technique of expanding an airflow vector will not be described here, and thus a diagram simplified for one direction will be used.

<Measurement Unit>

The measurement unit 10 is to emit laser light in a pulse form into the atmosphere, receive reflected light thereof, and measure a wind velocity in an optical-axis direction (emission-axis direction) on the basis of a Doppler shift amount in frequency between the emitted laser light and the reflected light. The measurement unit 10 includes an optical telescope 11 and an optical transceiver 12.

The optical telescope 11 emits laser light (transmission light) generated in the optical transceiver 12 into the atmosphere. The emitted laser light is scattered by fine aerosol particles floating in the atmosphere. The scattered light is received by the remote airflow measurement apparatus 100 via the optical telescope 11.

The optical transceiver 12 generates laser light of a single wavelength, for example, 1.5 μm, and also receives scattered light in the atmosphere and measures a frequency change amount (wavelength change amount) based on the Doppler effect, to thereby measure a wind velocity. In other words, the frequency change amount based on the Doppler effect is measured by comparing reception light (scattered light) received via the optical telescope 11 with the transmission light. The frequency change amount based on the Doppler effect is typically used to measure a wind velocity. This is generally called Doppler lidar. Lidar is an abbreviation for "Light Detection And Ranging", that is, a technique for remote observation that uses light.

In this embodiment, the laser light, which is a transmission signal, is a successive pulse train emitted into the atmosphere. Thus, a reception signal is also a pulse train, and a signal train of the frequency change amount based on the Doppler effect, that is, a signal train of a difference between the frequency of the reception signal, which is obtained when a reflected signal of the transmission signal is received, and the frequency of the transmission signal is a pulse train.

<Signal Processing Unit>

The signal processing unit 20 intermittently integrates the above-mentioned frequency change amount based on the Doppler effect, which is a pulse train, by using two systems to obtain two pieces of integrated data. It is assumed that the number of integration is, for example, 100 to 4000 times. The signal processing unit 20 calculates a reliability index of the reception signal by comparison based on the two pieces of integrated data.

Figure 2:
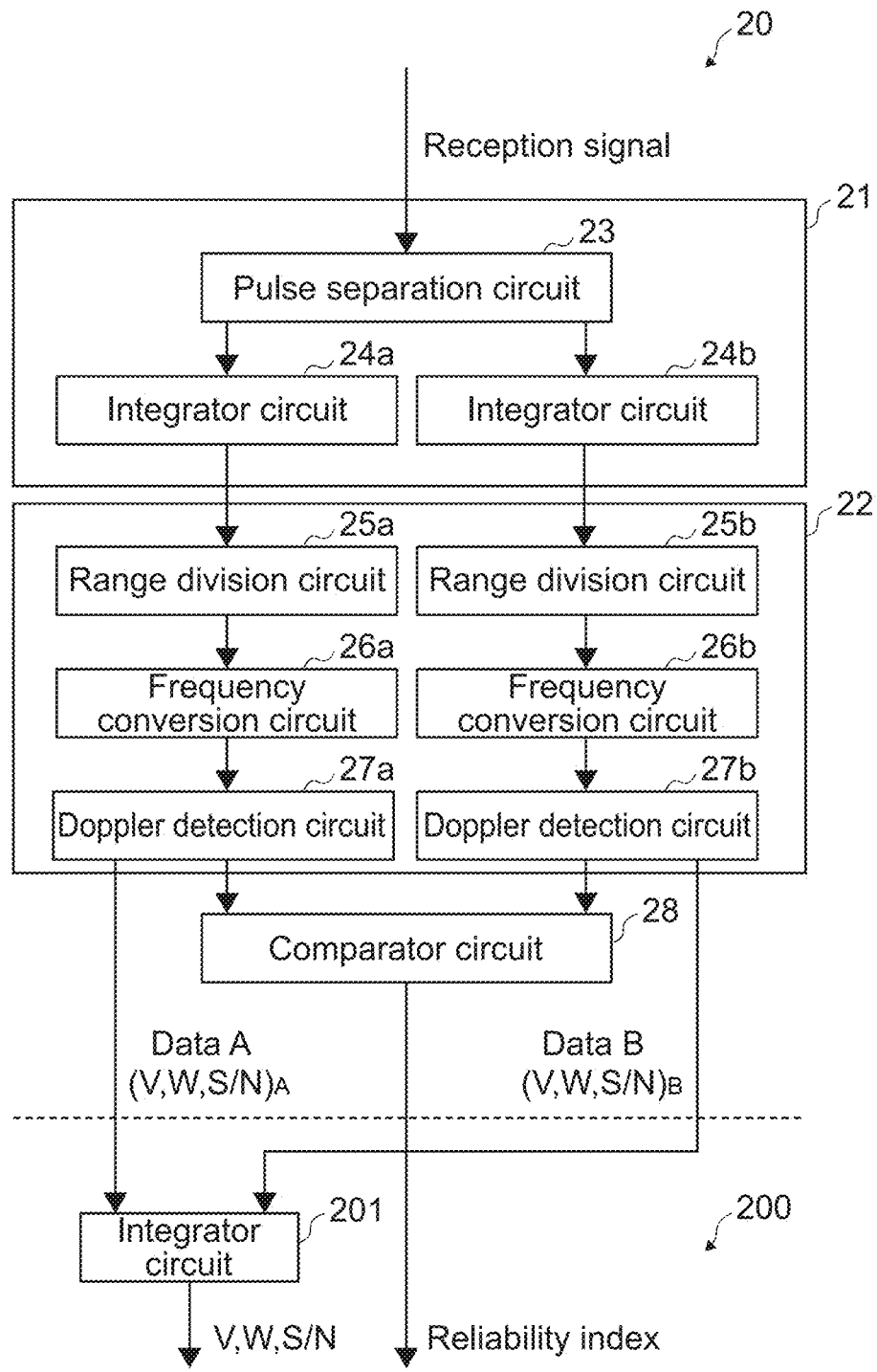
FIG. 2 is a block diagram of a configuration of a signal processing unit shown in FIG. 1.
Figure 3:
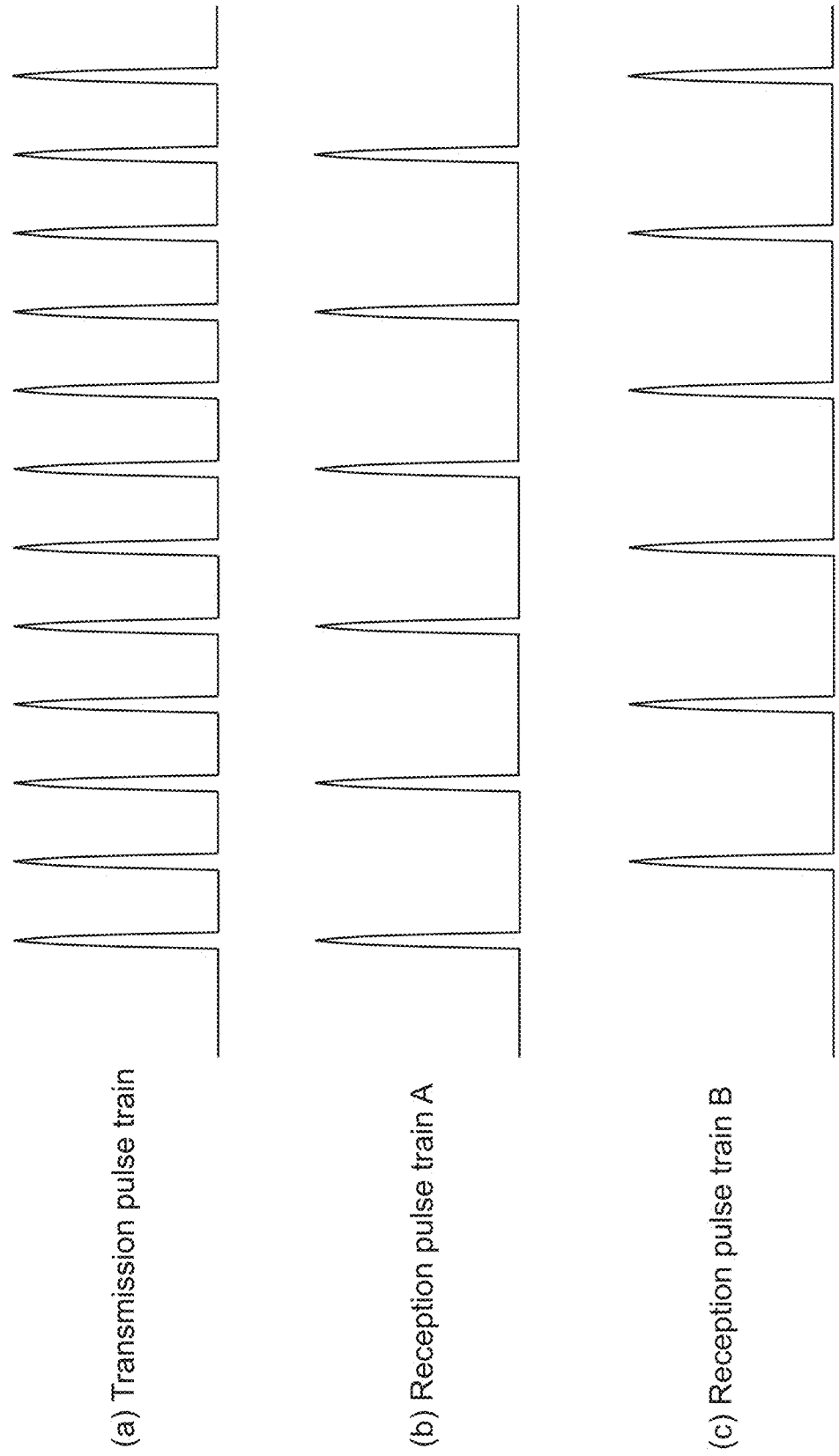
FIG. 3 is a conceptual diagram for describing that integration is performed using two systems to obtain two pieces of integrated data.
Figure 4:
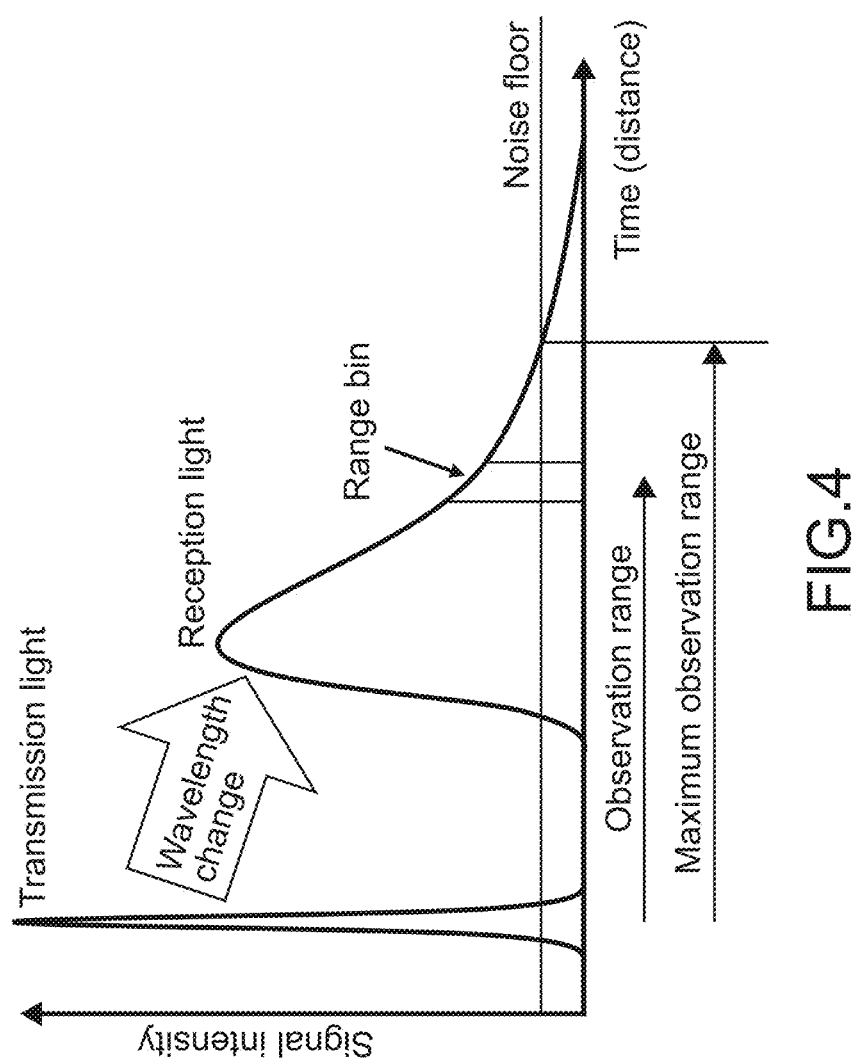
FIG. 4 is a graph showing a relationship between transmission light and reception light.

FIG. 2 is a block diagram of a configuration of the signal processing unit 20. FIG. 3 is a conceptual diagram for describing that integration is performed using two systems to obtain two pieces of integrated data. FIG. 4 is a graph showing a relationship between transmission light (transmission pulse signal) and reception light (reception pulse signal).

As shown in FIG. 2, the signal processing unit 20 includes a first integration unit 21, a Doppler detection unit 22, and a comparator circuit 28 as a reliability index calculation unit.

The first integration unit 21 intermittently integrates a pulse train corresponding to a reception signal by using two systems and obtains two pieces of integrated data.

The first integration unit 21 includes a pulse separation circuit 23 and two integrator circuits 24a and 24b.

The pulse separation circuit 23 inputs the above-mentioned frequency change amount based on the Doppler effect, which is a pulse train, from the measurement unit 10 and separates a reception pulse signal to be integrated in chronological order. In other words, as shown in FIG. 3, the pulse separation circuit 23 acquires a reception pulse signal from the measurement unit 10 and generates a reception pulse train A including pulses alternately arranged with respect to the transmission pulse train, and a reception pulse train B shifted from the reception pulse train A by one pulse.

The integrator circuit 24a integrates the reception pulse train A and calculates integrated data. The integrator circuit 24b integrates the reception pulse train B and calculates integrated data.

Use of the integrated data allows an improvement in signal-to-noise ratio (SNR).

The Doppler detection unit 22 divides each of the two pieces of integrated data into a plurality of range bins in time series, obtains a relationship between the frequency and the intensity in each range bin for each of the two pieces of integrated data, and detects a Doppler shift amount from the relationship.

The Doppler detection unit 22 includes two range division circuits 25a and 25b, two frequency conversion circuits 26a and 26b, and two Doppler detection circuits 27a and 27b.

As shown in FIG. 4, each of the range division circuits 25a and 25b divides the reception pulse signal in time series on the basis of the integrated data and specifies a range bin. FIG. 4 shows a state of the reception light that is a single reception pulse train with respect to the transmission light that is a single transmission pulse train. The reception pulse train changes in wavelength in accordance with a moving velocity (wind velocity) of a reflection object and is also scattered in accordance with a position (distance=time) at which the reflection object reflects the light, for example, as shown in FIG. 4. The wavelength changes are observed for each of the range bins divided in time series, and thus a wind velocity at each position (separation distance) can be measured. Note that a distance having signal intensity equal to or larger than the noise floor is a maximum observation range.

Each of the frequency conversion circuits 26a and 26b converts the signal in each range bin obtained from each of the range division circuits 25a and 25b, into a frequency, and obtains a relationship between the frequency (wind velocity) and the intensity (power spectral density) of the signal in each range bin.

Each of the Doppler detection circuits 27a and 27b detects a frequency peak value or the like from the intensity of the signal in each range bin for each frequency, and obtains a Doppler shift amount.

The comparator circuit 28 calculates a reliability index of the reception signal by comparing the Doppler shift amounts (wind velocity values) output from the two Doppler detection circuits 27a and 27b. Typically, the comparator circuit 28 outputs an absolute value of a difference between the two wind velocity values, as a reliability index.

Note that a second integrator circuit 201 integrates the two Doppler shift amounts, which are output from the two Doppler detection circuits 27a and 27b, thus allowing an improvement in SNR and accordingly allowing an improvement in measurement accuracy of a wind velocity. The second integrator circuit 201 may be mounted on, for example, the signal processing unit 20 configured by hardware, but the second integrator circuit 201 may be configured by software in a control computer 200 of a later stage, because of a small data amount. Additionally, instead of the second integrator circuit 201, a selection unit that selects a Doppler shift amount having a higher SNR may be employed when the Doppler shift amounts respectively output from the two Doppler detection circuits 27a and 27b are different from each other.

As described above, the Doppler shift amounts (wind velocities V) respectively output from the two Doppler detection circuits 27a and 27b and the reliability index output from the comparator circuit 28 are output from the signal processing unit 20 to the control computer 200 of a later stage. The following configuration may also be possible: data including a wind velocity variance value W (frequency width of signal) and a signal-to-noise ratio (SNR) is output from the signal processing unit 20 to the control computer 200 of a later stage.

Figure 5:
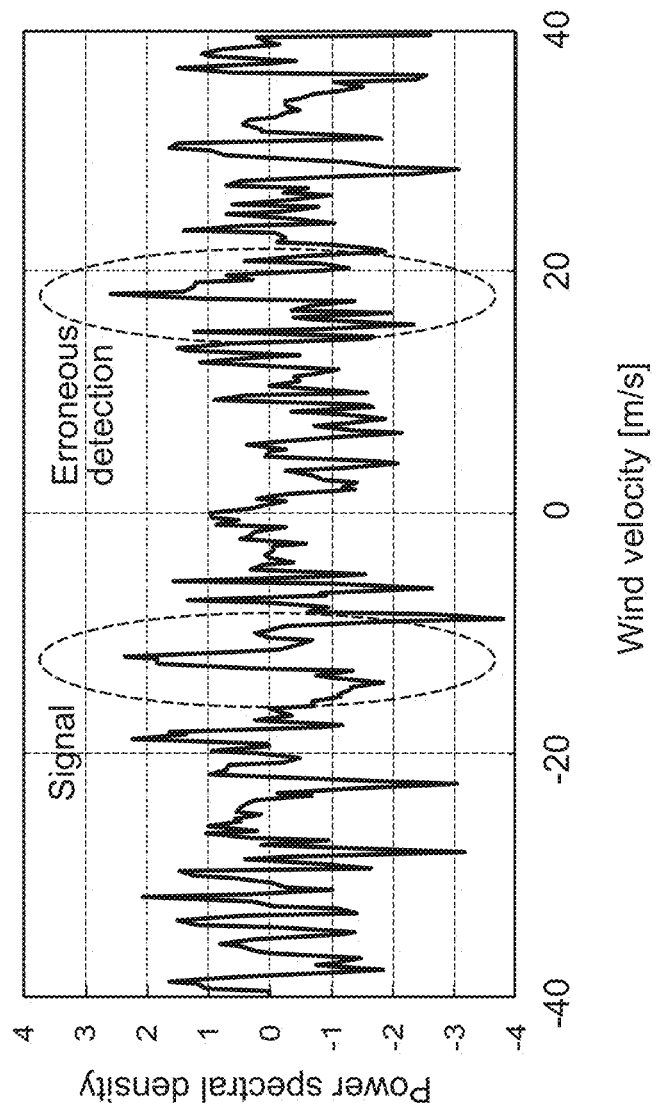
FIG. 5 is a graph showing a specific example of an erroneous detection measurement.

Here, FIG. 5 shows a specific example of an erroneous detection measurement. It is assumed that 1 m/s of the reliability index according to the present invention is set as a threshold for determining incorrect data within a measurement range of ±40 m/s as shown in the figure. An erroneous detection occurs at random frequencies (wind velocities), and thus the probability of successive occurrence of erroneous detections within the range of ±1 m/s is 1/40. Thus, the incorrect data can be reduced to 1/40 in this example. From the observation data obtained so far, variations in signal detection are in the range of approximately 0.22 m/s, and thus the threshold of 1 m/s is a realistic value with sufficient margin for inhibiting correct data from being mistaken for incorrect data.

<Other Embodiments>

Figure 6:
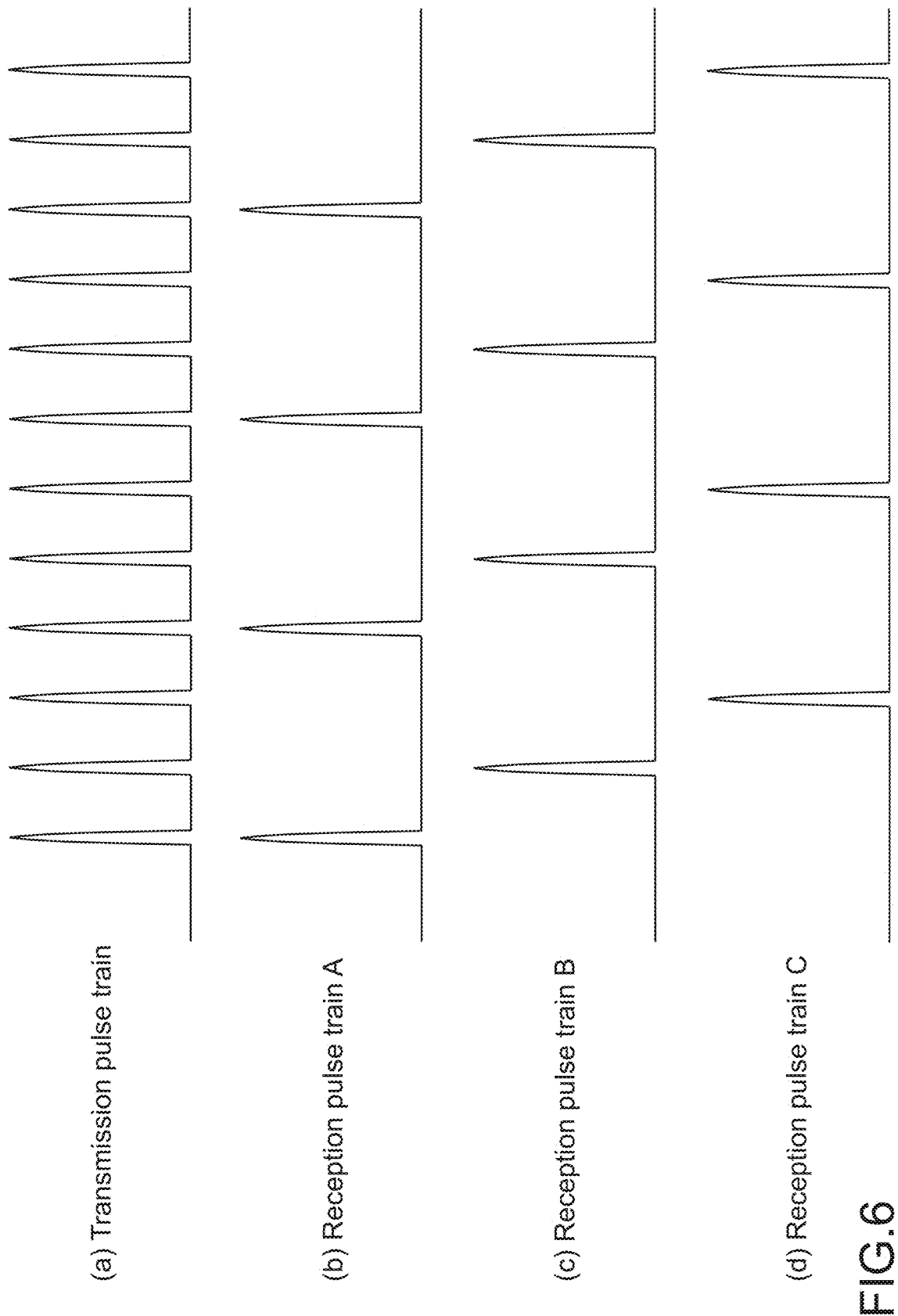
FIG. 6 is a conceptual diagram for describing that integration is performed using three systems to obtain three pieces of integrated data.

In the embodiment described above, the first integration unit 21 intermittently integrates a pulse train corresponding to a reception signal by using two systems and obtains two pieces of integrated data, but the first integration unit 21 may intermittently integrates a pulse train corresponding to a reception signal by using three systems and obtains three pieces of integrated data as shown in FIG. 6. Alternatively, the first integration unit 21 may obtain more pieces of integrated data. This can further reduce incorrect data.

For example, if the integration is divided into three as shown in FIG. 6, incorrect data is reduced to 1/1600. If the number of division is further increased, strictness of information of the reliability is improved, but the number of integration is reduced and the SNR is lowered. An appropriate number of division should be determined by experiments and designs. A reliability index obtained by the integration divided into three may be a sum or a mean of differences between three values or may be a difference between a minimum value and a maximum value. In the case where two of the three values are close values and the rest is a distant value, the two close values may be integrated to employ the resultant value as a measured value.

Figure 7:
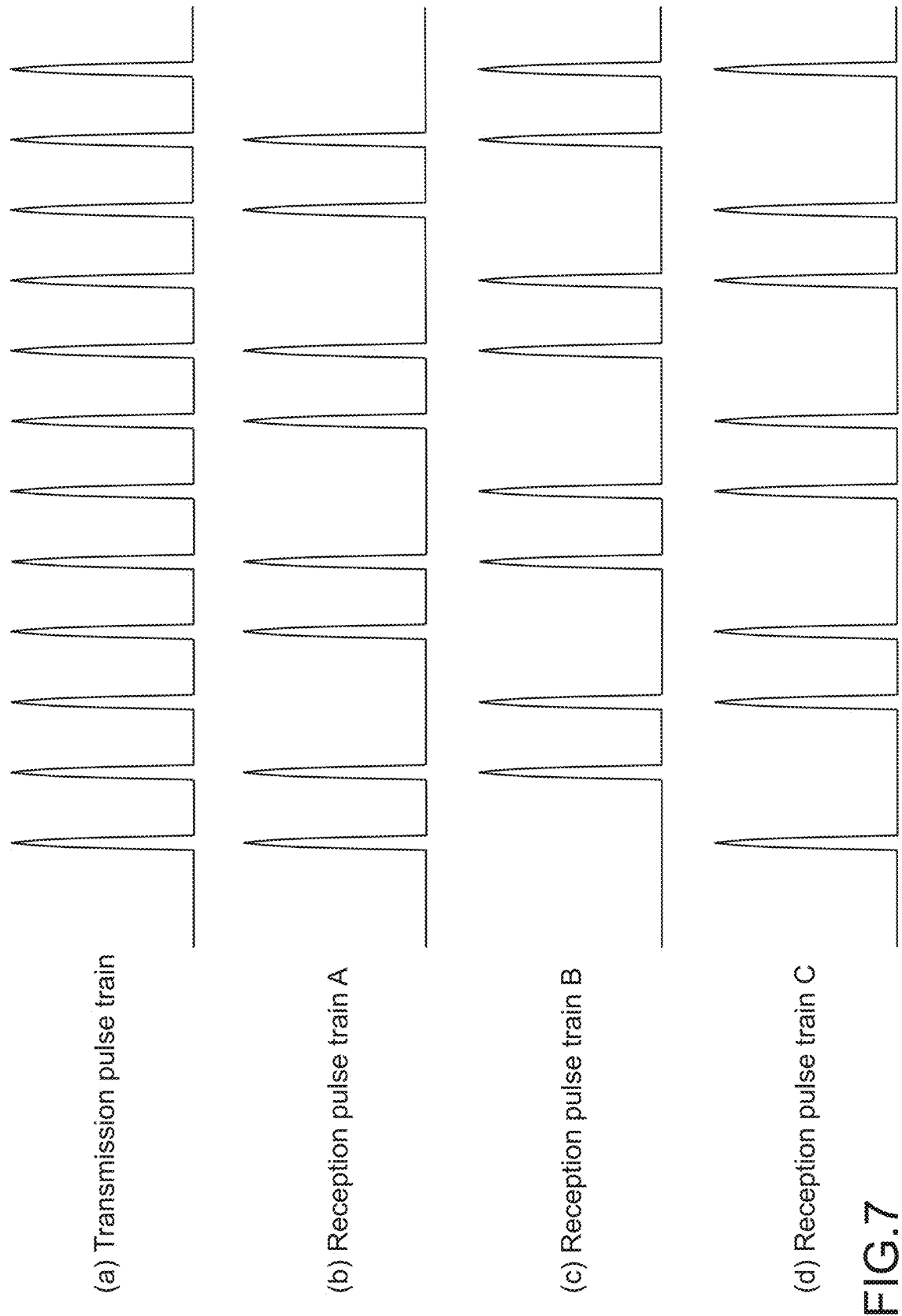
FIG. 7 is a conceptual diagram for describing that pulse trains of respective systems are integrated intermittently without setting regular intervals, to obtain integrated data.

As shown in FIG. 7, the pulse trains of the respective systems may be integrated intermittently, not at regular intervals. In this case, for example, the reception pulse trains of the respective systems may have overlapping pulses. This can ease the above-mentioned reduction in number of integration.

Figure 8:
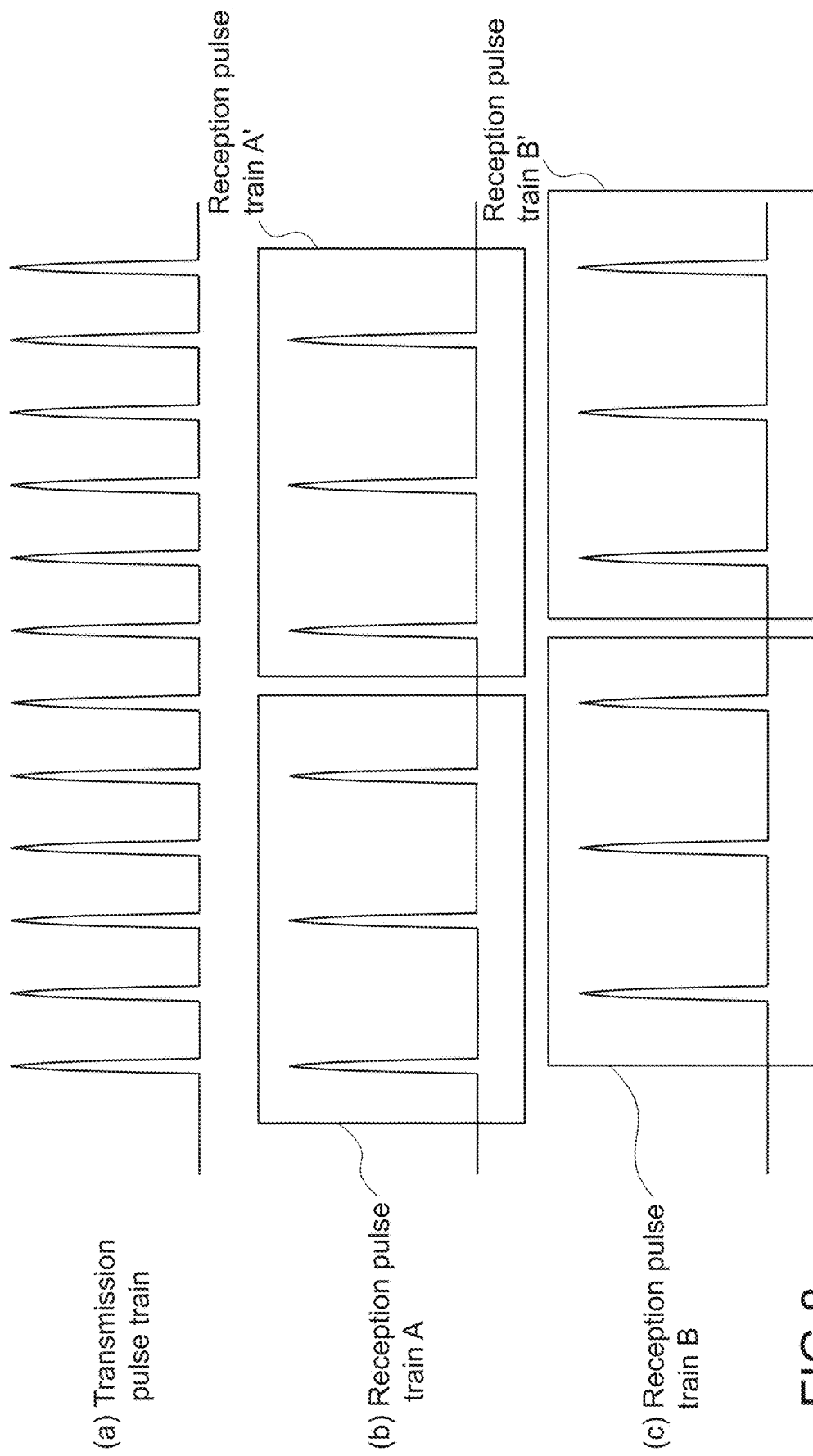
FIG. 8 is a conceptual diagram for describing that integrated data for improving a sampling rate is obtained.

As shown in FIG. 8, the following may be possible: reception pulse trains A and A' are integrated, reception pulse trains B and B' are integrated, and an absolute value of a difference between the obtained results is set as a reliability index; and wind velocity data to be output is obtained from results obtained when the reception pulse trains A and B are integrated and the reception pulse trains A' and B' are integrated. This can improve a sampling rate.

To use the reliability index for weighting, for example, it is only necessary to multiply a control gain by the reciprocal of the reliability index. This reciprocal may be multiplied by an appropriate coefficient.

<Actual Measurement Example>

An actual reception pulse is obtained by receiving light scattered in each range in the atmosphere and thus has a gently sloping shape with respect to the transmission light as shown in FIG. 4. As described above, the reception light is divided in time series, and thus a wind velocity can be independently obtained in each range bin.

Here, in the case where the pulse frequency is set to 1 kHz, a wind velocity can be calculated for the range of 150 km or less because the reciprocating distance of light is approximately 300 km. However, the reception intensity of scattered light is lowered in a long distance, and observation of 30 km or more can be rarely performed. Note that here the range bin length is, for example, 50 to 300 m.

Figure 9:
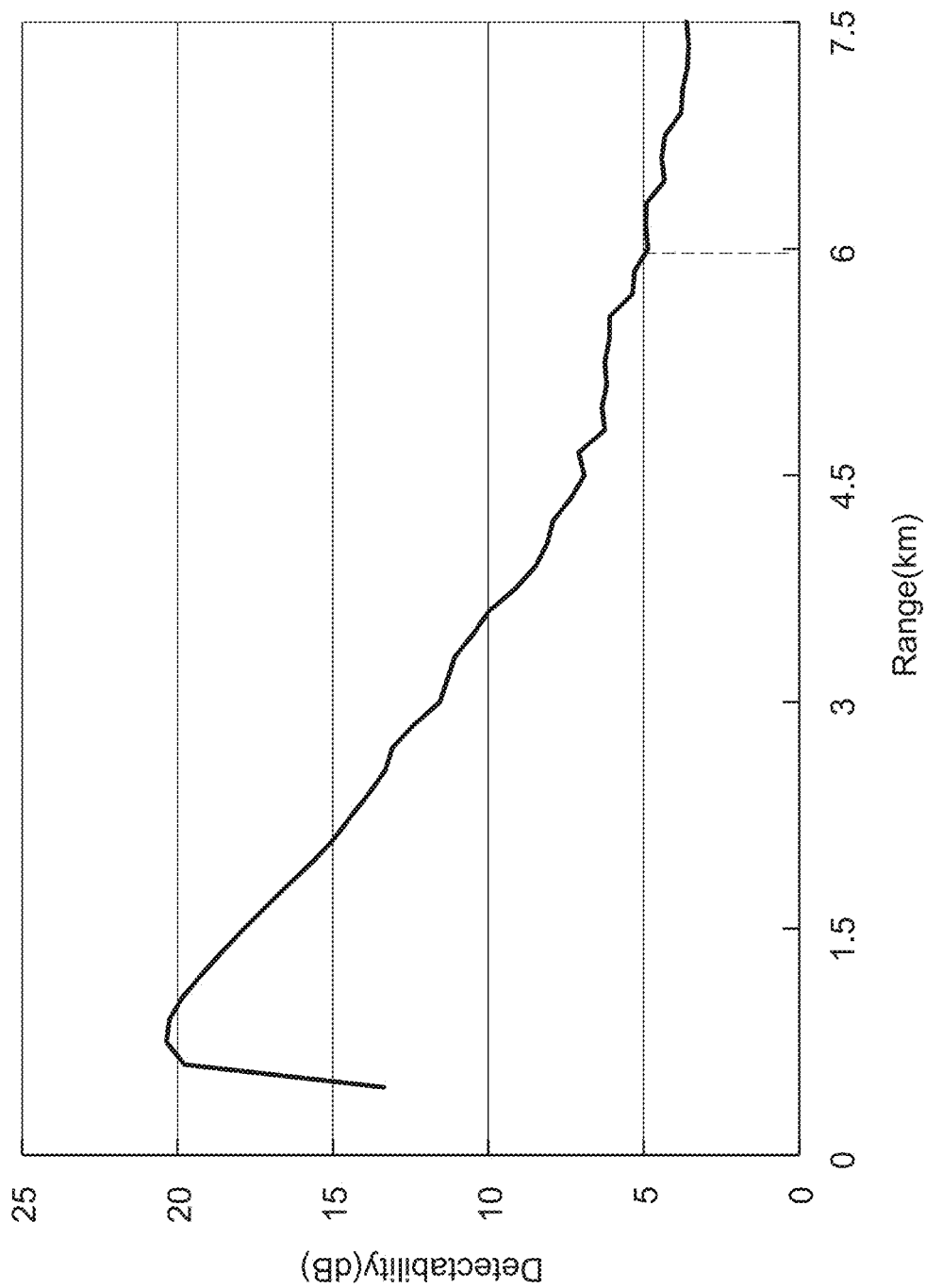
FIG. 9 is a graph showing reception data actually observed.

FIG. 9 shows reception data actually observed. Detectability is obtained by multiplying an SNR of one pulse by the square root of the number of integration times. A high value of the detectability indicates high reception intensity. For example, the reception light in the range of 6 km has a detectability of 5 dB.

Figure 10:
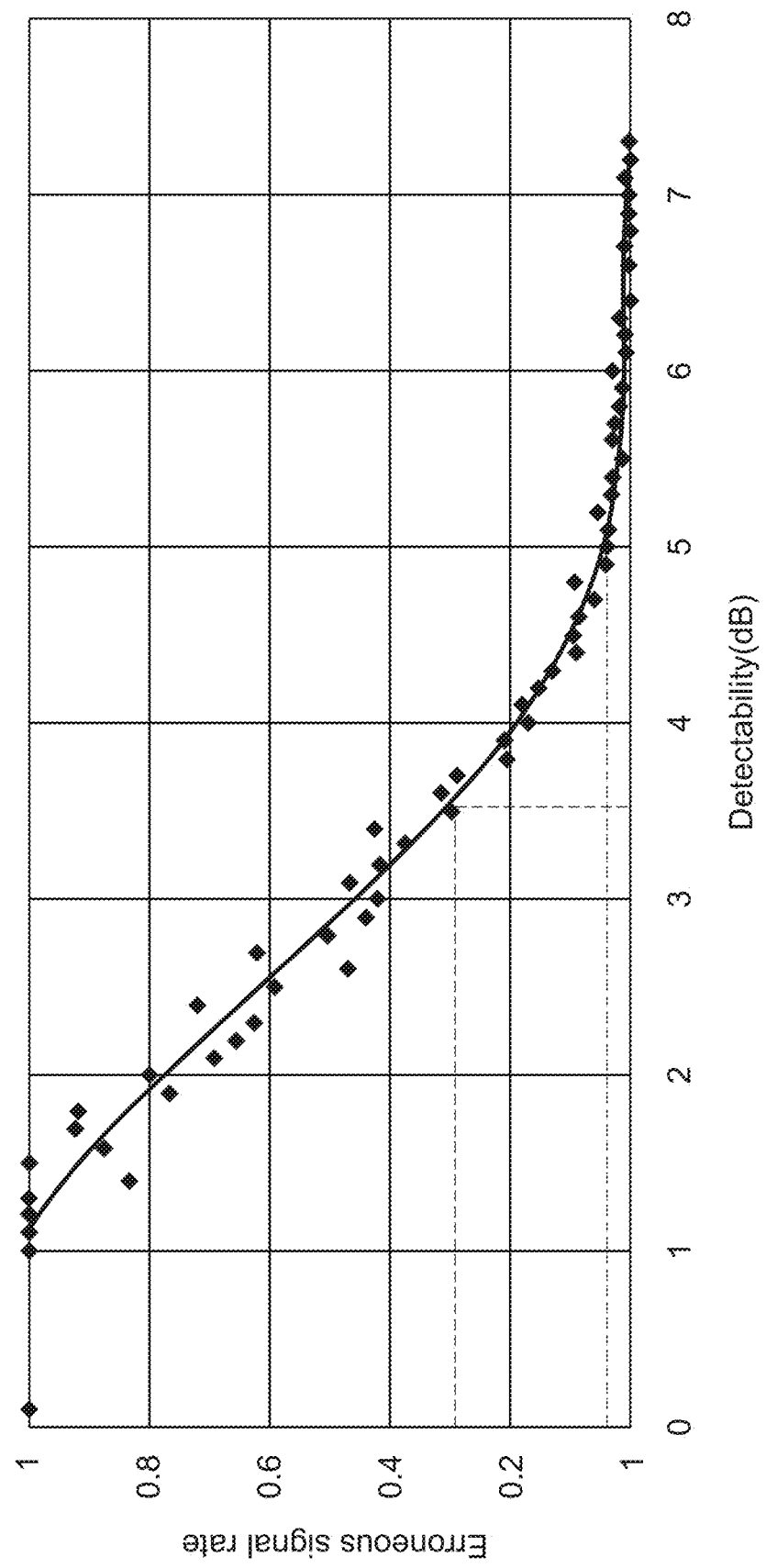
FIG. 10 is a graph showing an actual measurement example of a relationship between detectability and an erroneous signal rate.

FIG. 10 shows an example of an actually measured relationship between the detectability and an erroneous signal rate. In this example, approximately 5% of erroneous signal occurs at the detectability of 5 dB. If the integration method of obtaining integrated data by using two systems shown in FIG. 3 is applied to this case, the number of integration is ½, and thus the detectability is √(½) times, approximately 3.5 dB. The erroneous signal rate is approximately 30% in this case, but if the present invention is applied so as to remove incorrect data on the basis of the reliability index, the incorrect data is reduced to 1/40 as described above. Thus, 0.75% of incorrect data occurs and is dramatically reduced as compared with 5%, which is obtained in the case where the present invention is not applied. Note that this example reduces the usage rate of favorable data to 70%. This is because the description is given using a low detectability part for easy understanding of the figure. Actually, a higher detectability part should be used to reduce the rate of incorrect data. Conventionally, the incorrect data has slightly occurred even if the detectability exceeds 7 dB, but applying the present invention allows the incorrect data to be unboundedly brought close to zero.

<Use of Output Information>

As shown in FIG. 1, the control computer 200 is connected to a later stage of the airborne remote airflow measurement apparatus 100. The control computer 200 typically controls a control surface 400 by using an autopilot 300.

Here, the remote airflow measurement apparatus 100 adds a reliability index to a measured wind velocity of each range bin for each of the range bins, and transmits the result to the control computer 200.

The control computer 200 performs control computation to alleviate a gust of the aircraft in accordance with a change in wind velocity and transmits a lift control signal to the autopilot 300. At that time, if the reliability of measurement is low in accordance with the reliability index, the control computer 200 controls the autopilot 300 to reduce a control gain or stop controlling the control surface. The autopilot 300 optimally operates the control surface 400 in accordance with the specifications of the aircraft.

INDUSTRIAL APPLICABILITY

The Doppler lidar is characterized by being capable of remote airflow observation even in clear weather, but the Doppler lidar has a short effective observation range, which is pointed out by pilots of airline companies and is a heavy drag on practical use of the Doppler lidar. However, even with a short effective observation range of approximately 500 m, if the control surface is automatically controlled to alleviate a gust of the aircraft, turbulence-induced accidents can be inhibited. Applying the remote airflow measurement apparatus including the signal processing device according to the present invention allows an improvement in measurement reliability for forward airflow information and allows such airflow information, which serves as prior information for automatically controlling the control surface, to be applied to passenger airplanes.

[Others]

The present invention is not limited to the embodiments described above and can be variously modified and implemented. The range of the implementation belongs to the range of the technical idea of the present invention.

For example, in the above embodiments, the airborne remote airflow measurement apparatus including the signal processing device according to the present invention has been described as an example, but the remote airflow measurement apparatus including the signal processing device according to the present invention may be a ground apparatus.

Additionally, the remote airflow measurement apparatus including the signal processing device according to the present invention is also applicable to not only a Doppler lidar using light waves but also a Doppler radar using radio waves or a Doppler sodar using sound waves.

Figure 11:
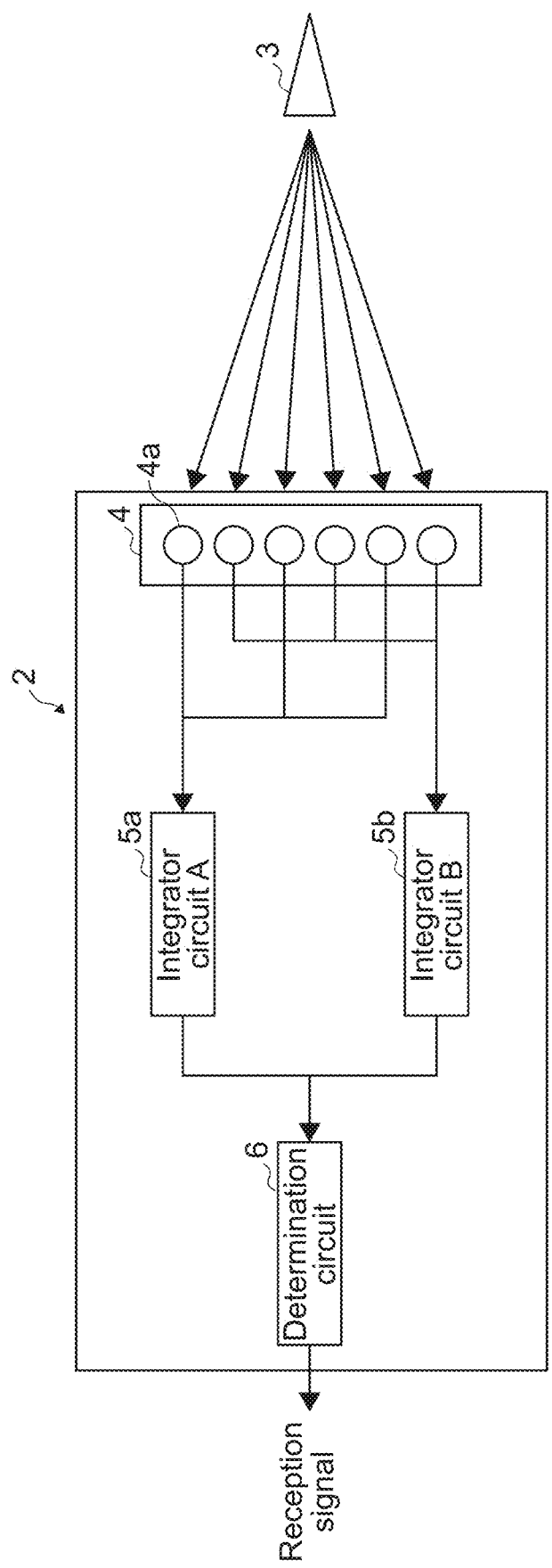
FIG. 11 is a block diagram showing a configuration of a system according to another embodiment of the present invention.

Furthermore, the present invention is applicable to not only those measurement apparatuses but also, for example, a receiver including many receiving elements. As shown in FIG. 11, a reception unit 4 including a plurality of receiving elements 4*a* receives a signal output from a transmission source 3. Two integrator circuits 5*a* and 5*b* receive the signals from the receiving elements 4*a* and obtain pieces of integrated data of the two systems. The two integrator circuits 5*a* and 5*b* each integrate the reception signals in different combinations, and a determination circuit 6 calculates a reliability index of the reception signals by comparison based on the pieces of integrated data of the two systems and eliminates information with low reliability, thus allowing an improvement in reception quality.

Here, the receiving elements 4*a* may be antennas for radio waves, microphones, or imaging devices. If real-time processing is unnecessary, the combinations of integration may be changed to maximize available information.

Additionally, the above embodiments have described the pulse train as an example. However, in this case, time-varying signal values are also comparable, and thus the reception signal does not need to be a pulse.

Additionally, the present invention is also applicable to a distance meter and the like.

If the present invention is applied to a distance meter, the distance meter only needs to have a high pulse rate and low pulse energy while having the same principle as a normal laser distance meter, and thus a small high-efficiency laser diode can be used without amplification. For example, assuming that the pulse rate is 100 kHz and the pulse energy is 10 µJ, the output of 1 Won average is obtained, and information of a distance up to 1.5 km can be output in a period of 50 Hz, for example. The present invention can be used for proximity sensors for vehicles, ships, satellites, and the like.

Figure 12:
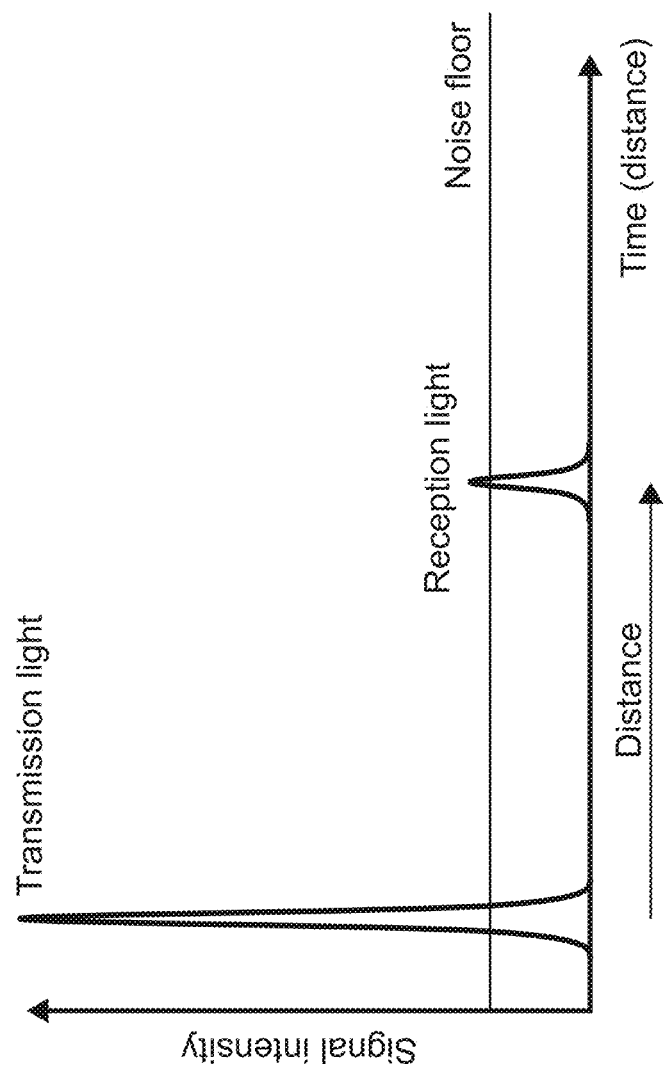
FIG. 12 is a graph showing a relationship between transmission light and reception light in still another embodiment of the present invention.

In this case, as shown in FIG. 12, the transmission light and the reception light have a one-to-one relationship, which does not need distance division or frequency measurement. It is only necessary to integrate the reception light by two integrator circuits, calculate a reliability index by comparison of those integrations, and remove information with low reliability.

REFERENCE SIGNS LIST

20 signal processing unit
21 integration unit
22 Doppler detection unit
23 pulse separation circuit
24*a* integrator circuit
24*b* integrator circuit
25*a* range division circuit
25*b* range division circuit
26*a* frequency conversion circuit
26*b* frequency conversion circuit
27*a* Doppler detection circuit
27*b* Doppler detection circuit
28 comparator circuit
201 second integrator circuit

The invention claimed is:

1. A signal processing device, comprising:
a first integration unit that intermittently integrates a pulse train corresponding to a reception signal by using a plurality of systems to obtain a plurality of pieces of integrated data; and
a reliability index calculation unit that calculates a reliability index of the reception signal by comparison based on the plurality of pieces of integrated data,
wherein the pulse train corresponding to the reception signal is a pulse train of a difference between a frequency of the reception signal and a frequency of a transmission signal, the reception signal is obtained when a reflected signal of the transmission signal is received, and the transmission signal includes successive pulse trains emitted into an atmosphere,
wherein the signal processing device comprises a Doppler detection unit that divides each of the plurality of pieces of integrated data into a plurality of range bins in time series, obtains a relationship between a frequency and intensity in each of the range bins for each of the pieces of integrated data, and detects a Doppler shift amount from the relationship, and
wherein the reliability index calculation unit calculates a reliability index of the reception signal by comparing the Doppler shift amounts of the plurality of pieces of integrated data.

2. The signal processing device according to claim 1, further comprising a second integration unit that integrates the Doppler shift amount of each of the plurality of pieces of integrated data.

3. The signal processing device according to claim 1, wherein the reliability index calculation unit calculates, as the reliability index, a difference in a Doppler shift amount between the plurality of pieces of integrated data.

4. A signal processing method, comprising:
intermittently integrating a pulse train corresponding to a reception signal by using a plurality of systems to obtain a plurality of pieces of integrated data; and
calculating a reliability index of the reception signal by comparison based on the plurality of pieces of integrated data,
wherein the pulse train corresponding to the reception signal is a pulse train of a difference between a frequency of the reception signal and a frequency of a transmission signal, the reception signal is obtained when a reflected signal of the transmission signal is received, and the transmission signal includes successive pulse trains emitted into an atmosphere,
wherein the signal processing method comprises, by a Doppler detection unit, dividing each of the plurality of pieces of integrated data into a plurality of range bins in time series, obtaining a relationship between a frequency and intensity in each of the range bins for each of the pieces of integrated data, and detecting a Doppler shift amount from the relationship, and
wherein the step of calculating the reliability index includes calculating a reliability index of the reception signal by comparing the Doppler shift amounts of the plurality of pieces of integrated data.

* * * * *